United States Patent [19]

Moore

[11] Patent Number: 4,591,331
[45] Date of Patent: May 27, 1986

[54] APPARATUS AND METHOD FOR BURNING FUEL

[75] Inventor: Colin Moore, Chellow Dene, England

[73] Assignee: The BOC Group, plc, London, England

[21] Appl. No.: 651,451

[22] Filed: Sep. 11, 1984

[30] Foreign Application Priority Data

Sep. 14, 1983 [GB] United Kingdom ............... 8324644

[51] Int. Cl.[4] .............................................. F23N 5/24
[52] U.S. Cl. ........................................ 431/16; 431/22; 110/189; 110/262; 73/40.5 R
[58] Field of Search ................ 431/16, 22; 110/189, 110/262, 265; 73/40.5 R

[56] References Cited

U.S. PATENT DOCUMENTS 3,910,209 10/1975 Albrecht et al. ................... 110/189

Primary Examiner—Carroll B. Dority, Jr.
Attorney, Agent, or Firm—David A. Draegert; Larry R. Cassett; David L. Rae

[57] ABSTRACT

A fuel burner 2 for burning a fuel such as pulverized coal carried by a fluid, particularly air, has an inner passage for the particulate fuel-carrier medium and an outer passage for a combustion-supporting gas (typically oxygen-enriched air or pure oxygen). The inner passage typically terminates in a nozzle having an orifice therethrough. The inner passage 12 is surrounded by a jacket containing a pressurized fluid. A pressure sensor senses the pressure in the jacket. In the event that abrasive wear of the inner passage causes holes to be formed therein, fluid will pass from the jacket into the inner passage causing a pressure drop in the jacket which is sensed by the pressure sensor. The burner may then be shut down without any hazard having been caused by contact between the pulverized coal and pure oxygen or oxygen-enriched air. The burner may also be used for the autogenous oxidation or thermal cracking of chemicals.

20 Claims, 4 Drawing Figures

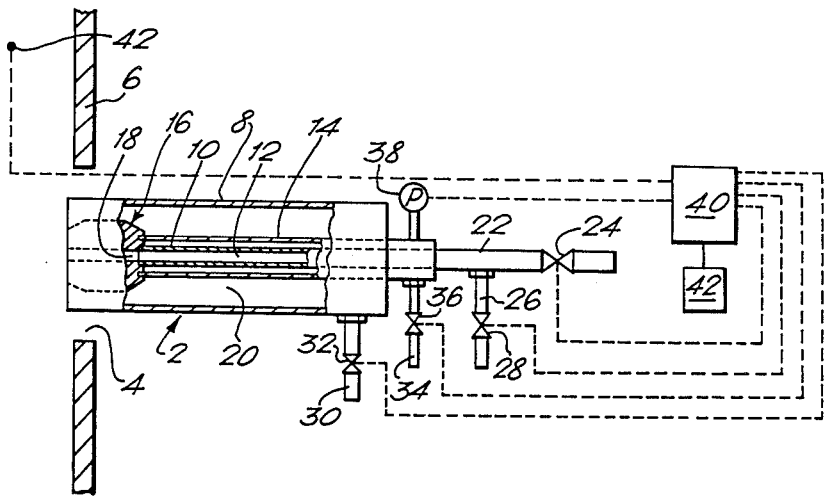

APPARATUS AND METHOD FOR BURNING FUEL

BACKGROUND OF THE INVENTION

This invention relates to an apparatus and a method for burning fuel. It is particularly but not exclusively concerned with the combustion of the fuel comprising a particulate carboniferous material fluidised in a gaseous carrier, particularly air.

Pulverised coal or other such particulate combustible material potentially offers a cheap source of fuel. Our co-pending application No. 82 11130 (published as U.K. patent application No. 2 099 132A) provides a method of burner for burning pulverised or particulate solid fuel employing oxygen or a gas mixture relatively rich in oxygen (typically oxygen-enriched air) to support combustion of the fuel. A typical example of the burner is shown in and described with reference to the drawings accompanying U.K. patent application No. 2 099 132A. It includes an inner passage for fuel such as pulverised coal fluidised in a carrier gas such as air, and an outer passage for substantially pure oxygen. Typically, means for forming a pilot flame are provided so as to enable the burner to be lit.

After prolonged use, burners such as that shown in a patent application No. 2 099 132A tend to fail as a result of the abrasive action of the pulverised coal wearing away the wall or walls defining the passage along which the coal is conveyed. Moreover, such erosion of the passage walls result in the formation of holes affording communication between the oxygen stream and the pulverised fuel stream. This can give rise to the formation of a potentially explosive or hazardous mixture of oxygen-enriched carrier gas and pulverised fuel. Since the outer surface of the conduit defining the passage for the pulverised fuel comes into contact with substantially pure oxygen passingthrough the outer passage it is desirable to make the conduit of a material which is safe for use with oxygen.

Copper is therefore the natural choice of material for forming this conduit. However, copper is a relatively soft metal which tends to be relatively radidly eroded by the abrasive action of the pulverised fuel, and thus a further limitation is placed on the working life of the burner.

Analogous problems may arise in the combustion of heavy fuel oil which in practice tends to have an abrasive action on the walls of the passage tha conveys it. Also, it is known to employ burners in the oxidation of chemical materials or in their thermal cracking. An example of the former process is the oxidation of ore concentrates such as copper sulphide which autogenously react (or combust) in an oxygen-rich atmosphere. The ore concentrate is conveyed through the burner in suspension in a carrier which may carry or comprise a fuel. Alternatively the fuel may be supplied separately. Sufficient oxygen is supplied for the complete combustion of the fuel and the complete oxidation of the sulphide. In this kind of example, the sulphide may cause abrasive wear of the walls of the passage that convey it through the burner. In the thermal cracking of for example sulphate waste the waste may comprise a suspension of solids in liquid or may have a fluid carried added. Again fuel may be added to the waste or may be supplied separately. The solid sulphate particles may cause abrasive wear of the walss of the passage that conveys it through the burner.

THE INVENTION

It is an aim of the present invention to provide a burner and a method of burning a fuel medium or oxidising or thermally treating a chemical medium which make it possible for a failure in the integrity of the conduit that conveys the fuel medium or chemical medium to be detected and which in some preferred embodiments of the invention make possible or facilitate the ignition and stable combustion of a particulate fuel (in the example of the fuel being pulverised coal) even if the fuel is conveyed as a so-called "dense phase" in a fluid such as air.

According to the present invention there is provided a burner for burning a fuel medium or for oxidising or thermally treating a chemical medium, including at least one inner passage for conveyiing a stream of the fuel medium or chemical medium to a combustion zone created by the burner in operatin thereof; at least one outer passage for conveying a combustion supporting gas; and a jacket intermediate said inner and outer passages, and surrounding said inner passage along at least part of its length, and in which jacket a detachable fluid pressure is able to be established.

The invention also provides a method of burning a fuel medium, or oxidising or thermally treating a chemical medium, including the steps of applying a stream of the fuel medium or chemical medium to the combustion zone of a burner via at least one inner passage of the said burner; conveying a combustion-supporting gas to said combustion zone via at least one outer passage of said burner; maintaining a fluid pressure within a jacket intermediate said inner and outer passages and surrounding said inner passsage along at least part of its length, and detecting a drop in the pressure within the jacket.

The drop in the pressure in the jacket is indicative of abrasive wear of the inner passage having formed a hole or holes in its wall.

In some preferred embodiments of the burner according to the invention, the jacket communicates through a restrited orifice or passage with said inner passage or an outlet of the burner (or both). Accordingly, a combustible fluid may be employed to pressurise the jacket and to facilitate the raising of the temperature of an enclosure being heated by the burner to a level at which ignition of the solid particulate fuel will take place. The combustible fluid may for example be selected from natural gas, methane, propane and butane. Indeed, by using such a preferred embodiment of the burner according to the invention, it is possible to achieve such ignition temperature without needing to resort to a separate auxiliary burner for the purpose of raising the temperature of the enclosure to a value at which ignition of the pulverised fuel will take place. Moroever, such supply of combustible fluid may be employed to help maintain a stable flame during operation of the burner once an ignition temperature has been achieved. In alternative preferred embodiments of the invention, the jacket is closed and in this example the pressure in the jacket is preferably created by supplying to the jacket a fluid such as air, nitrogen or carbon dioxide, although a hydraulic fluid could alternatively be employed. If desired, a liquid or gaseous fuel may be supplied directly to said inner passage for the purpose of raising the temperature of the enclosure being heated at start up of the burner and/all for the purpose of helping to maintain a stable flame during normal operation of the burner. The combustible fluid is preferably a fuel gas. It may for example be natural gas, methane, propane or butane.

Typically, the burner forms part of an apparatus including means for sensing the pressure in the jacket (or a change in such pressure), and means responsive to such pressure sensor to shut down the burner (i.e. stop the supply of materials to said burners) and/or to sound an alarm. Typically, the apparatus will include automatically operable valves controlling the supply of fuel medium or chemical medium and combustion supporting gas to the burner.

The burner preferably has at its outlet end a nozzle having an outlet passage in which the or each said inner passage terminates. Typically, the nozzle restricts to at least some degree the said outer passage preferably such that in operation combustion-supporting gas leaves the burner with a vertical component of velocity whereby it mixes with the particulate fuel medium downstream of the burner.

In alternative embodiments, the nozzle may define a plurality of passages which surround the said outlet passage and which communicate with the said outer passage. The fuel medium may for example be a heavy fuel oil or a "particulate fuel medium" by which is meant a particulate fuel carried by or in suspension in a fluid carrier. Preferably the fluid is gaseous. It is typically air though alternatively, other gases such as nitrogen or carbon dioxide can be used. The chemical medium may for example be of the kind described hereinabove.

The combustion supporting gas may be air but is preferably oxygen-enriched air or substantially pure oxygen. The use of oxygen-enriched air with pure oxygen facilitates combustion of particulate fuel (typically pulverised coal). If desired, during the period in which the enclosure (e.g. a furnace, kiln, boiler or other installation) is being raised to the desired operation temperature, air may be used as the combustion-supporting gas, and only combustible fluid supplied through the inner passage. Once the desired operating temperature has been reached, the pulverised fuel medium may be supplied and oxygen or oxygen-enriched air used as the combustion-supporting gas. Depending on the density of the pulverised fuel medium (i.e. the ratio of weight of solid fuel to weight of carrier gas supplied per unit time), it may be possible to discontinue or reduce the rate of supply of the combustible fluid once the desired operating temperature has been reached when embodiments of the burner according to the invention having a closed jacket are employed. Typically during "steady-state" operation the combustible fluid supplies thermal energy at the rate of 0 to 15% (preferably 5 to 10%) of that of the pulverised fuel. Burners and methods according to the present invention will now be described by way of example with reference to the accompanying drawings, in which:

Figure 1:
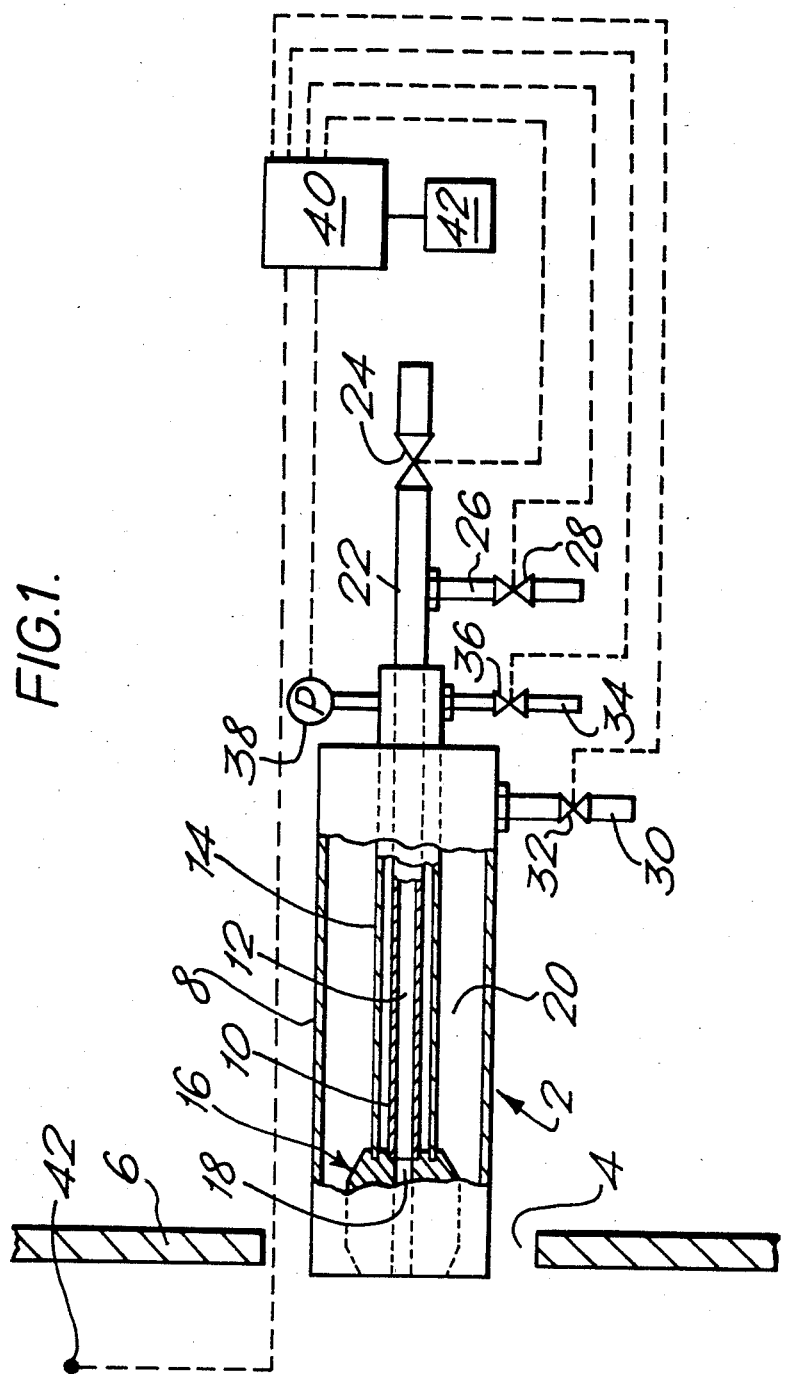
FIG. 1 is a schematic diagram illustrating one burner according to the invention.

Referring to FIG. 1 of the accompanying drawings, there is shown a burner 2 which extends into a port 4 of an enclosure 6 to be heated by the burner in operation 2.

The burner 2 has an outer shell 8. The shell 8 may be cooled by means not shown in FIG. 1. (Typically, it is provided with a passage through which coolant such as water or air may be passed for this purpose). The burner 2 also has an inner pipe 10 defining an inner passage 12. The pipe 10 is surrounded by a coaxial jacket 14. The pipe 10 and jacket 14 both terminate in an outlet nozzle 16. The passage 12 thus communicates with an orifice 18 which is formed in the nozzle 16 and is coaxial with the pipe 10 and which in operation of the burner 2 passes particulate fuel medium to the burner flame. The nozzle 16 acts as closure for the jacket 14. The jacket 14 and the nozzle 16 define the inner wall of a generally annular outer passage 20 for oxygen or other combustion-supporting gas, the outer wall of which is defined by the inner surface of the shell 8.

In operation of the burner 2, particulate fuel medium is supplied to the inner passage 12 of the burner 2 and substantially pure oxygen or oxygen-enriched air to its outer passage 20, while the jacket 14 is filled with a fluid under pressure. Thus, the burner has associated therewith a first conduit 22 for supplying particulate fuel medium to the inner passage 12. The conduit 22 has a flow control valve 24 disposed therein. Downstream of the valve 24, a second conduit 26 terminates in the conduit 22. The second conduit 26 itself has a flow control valve 28 disposed therein and communicates with a source of fuel gas (not shown). Thus, it is possible to increase the calorific value of the particulate fuel medium by mixing fuel gas with it upstream of the burner 2.

The burner 2 also has associated therewith a third conduit 30 whose upstream end communicates with a source of oxygen-containing gas (not shown) and whose downstream end communicates with the outer passage 20 of the burner 2. The conduit 30 has a flow control valve 32 disposed therein.

Additionally, the burner 2 has associated therewith a fourth conduit 34 which communicates at its downstream end with the interior of the jacket 14 and at its upstream end with a source of fluid (typically gas, for example nitrogen) under pressure. The conduit 34 has a flow control valve 36 disposed therein. A pressure sensor 38 communicates with the conduit 34 downstream of the valve 36 so as to provide a measure of the fluid pressure in the jacket 14. The pressure sensor 38 is adapted to generate signals indicative of the pressure it senses, which signals are transmitted to a control unit 40 which controls the operation of the aforementioned valves. There is also a temperature sensor 42 located within the enclosure 6 at a location not impinged upon by the flame in operation of the burner. This temperature sensor 42 is adapted to generate signals indicative of the temperature it senses, which signals are transmitted to a control unit 40 which controls the operation of the aforementioned valves.

The jacket 14 is arranged to surround the whole of that part of the inner pipe 10, whose outer surface, were it not so surrounded, would contact oxygen-containing gas admitted to the outer passage. Typically the whole length of the pipe 10 is surrounded by the jacket 14. Thus, in the event that the inner pipe 12 is worn away by the abrasive action of the particulate fuel medium to form one or more orifices, the jacket 14 precludes the particulate fuel medium from coming into contact with the oxygen-containing gas, and vice versa, in the burner itself, and thereby prevents potentially hazardous or explosive conditions from being created in the event that oxygen-enriched air or substantially pure oxygen is used as the oxygen containing gas. Moreover, it enables the pipe 10 to be formed of a relatively hard alloy (e.g. of Stellite-Registered Trade Mark) which it would not be safe to use were it to come into contact with pure oxygen or oxygen-enriched air. (Normally relatively soft materials such as copper and brass are used with pure oxygen or oxygen-enriched air.) By forming the pipe 10 of a relatively hard material it is possible for form a burner 2 having a substantially longer working life than a comparable burner that has the pipe 10 formed of brass or copper.

The burner 2 may be provided with means (not shown) for igniting combustible material issuing therefrom. Such means may include an automatic ignition device, and/or, if desired, means for forming a pilot flame.

Figure 2:
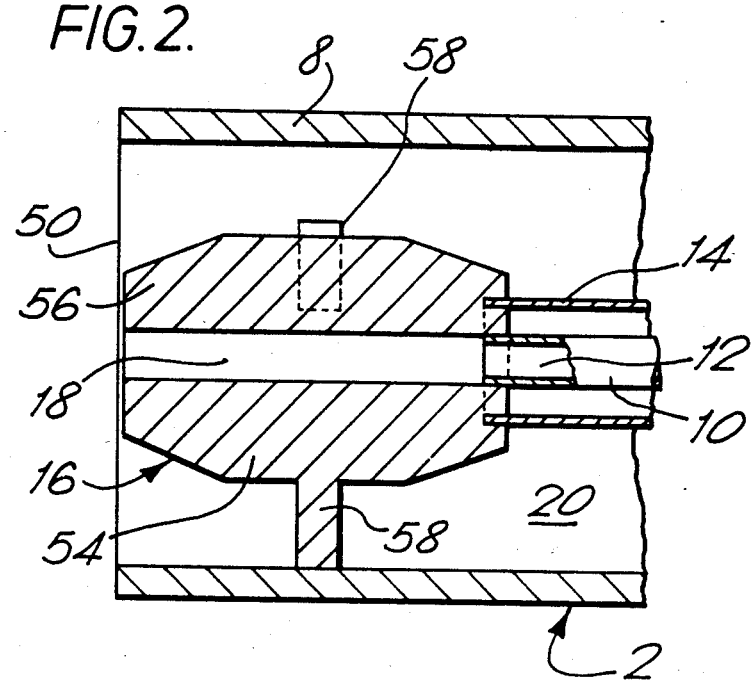
FIG. 2 is a schematic side elevation, partly in section of a burner nozzle forming part of the burner shown in FIG. 1.
Figure 3:
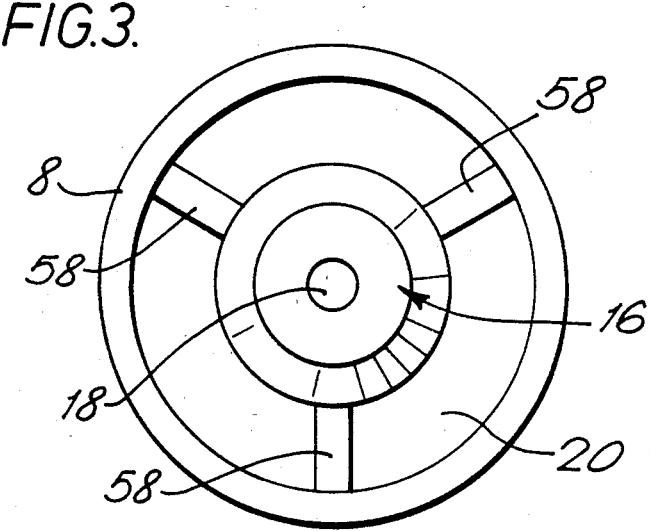
FIG. 3 is an end view of the nozzle shown in FIG. 2.

The end nozzle 16 of the burner 2 is shown in more detail in FIGS. 2 and 3 of the accompanying drawings. It is of convergent-divergent section, having a frusto-conical first part 52 which diverges in the direction of the burner tip 50, a right cylindrical second part 54, and a frusto-conical third part 56 that converges in the direction of the burner tip 50. The part 54 has three integral lugs 58 that engage the inner surface of the shell 8 and are in good heat conductive relationship therewith. The nozzle 16 is preferably monolithic, that is of one piece construction, typically being formed of copper or brass. The nozzle 14 has a single orifice 18 formed therethrough from front face to rear face. The orifice 18 can be formed of sufficiently large diameter to preclude blockages of such orifice 18 by particles in the particulate fuel medium. In operation, the oxygen-containing gas medium passes through the passage 20, between the nozzle 16 and the inner surface of the shell. The convergent-divergent shape of the nozzle helps to provide a vertical component of velocity into the gas leaving the passage 20 such that it comes into contact with the particulate fuel medium issuing from the exit of the orifice 18.

The burner shown in FIGS. 1 to 3 may for example be operated as follows.

At start up, the valve 24 is in a closed position, but the remaining valves are in open positions. Fuel gas such as propane is supplied to the conduit 26, from which it flows into the conduit 22 and thence to the inner passage 12 of the burner 2, exiting the burner through the orifice 18 of the nozzle 16. Air, oxygen-enriched air or pure oxygen is passed through the conduit 30 and enters the outer passage 20 of the burner 2. It then passes through the passage 20 and leaves the burner in an annular stream or jet that impinges upon the fuel gas stream to form a mixture which is ignited to provide a flame. The jacket 14 is placed in communication with a source of gas under pressure via the conduit 34 and is thereby pressurised to a chosen pressure and then sealed by closing the valve 36.

When the temperature of the enclosure 6 has reached a sufficiently high value to sustain combustion of the chosen particulate fuel medium, the valve 24 is opened and the particulate fuel medium supplied to the conduit 22 and flows therethrough and then through the passage 12 to the burner flame. The particulate fuel medium is preferably a suspension of pulverised coal in air. Depending on the ratio of mass of coal to mass of air in the particulate fuel medium, it may be necessary to continue to supply the fuel gas to the flame and/or employ oxygen-enriched air or pure oxygen (instead of air) as the combustion-supporting gas. This ratio may vary from 1:2 to 10:1. At higher ratios, continued supply of the fuel gas and use of oxygen-enriched air or pure oxygen as the combustion-supporting gas may both be desirable, whereas at lower ratios, it may be possible to use air as the combustion-supporting gas if the supply of fuel gas is continued, or to discontinue supplying fuel gas if oxygen-enriched air or pure oxygen is supplied as the combustion supporting gas.

If desired, the burner 2 may be provided as shown, with automatic control means 40 to open and close the necessary valves to enable the burner to be switched from a "start-up" mode of operation in which no particulate fuel medium is burnt to a "stready state" operation mode in which particulate fuel medium is burnt.

In operation of the burner 2, as the particulate fuel medium passes along the pipe 10 so it tends to erode its internal surface. Eventually, this wear tends to become so marked that a hole is formed in the pipe. This will result in a loss of pressure from the jacket 14 in consequence of gas escaping into the interior of the pipe 10 from the jacket 14. This drop in pressure will be detected by virtue of a change in the reading of the pressure sensor. In an automatic burner system, an alarm 42 sounds and all the valves are automatically closed thereby shutting down the burner. It will be appreciated that no safety risk is occasioned by virtue of the failure of the pipe 10 as on its failure there is no contact between fuel and oxygen-rich gas.

Figure 4:
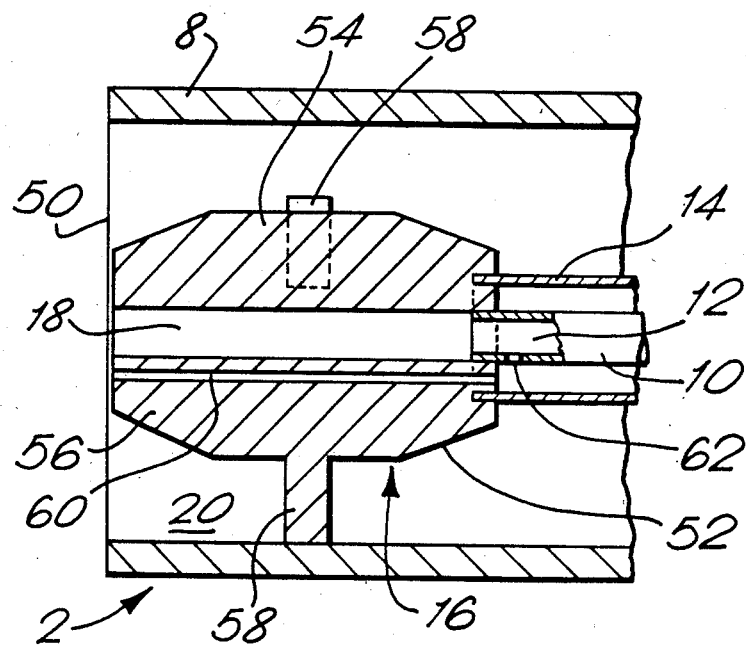
FIG. 4 is a schematic side elevation, partly in section of a modified burner according to the invention.

In FIG. 4 there is illustrated a modification to the burner shown in FIGS. 1 to 3. In this modification, the jacket 14 is employed as a means of supplying liquid fuel or preferably, fuel gas to the burner flame. Accordingly, there is a restricted orifice 60 provided in the nozzle 16 affording communication between the jacket 14 and the tip 50 the burner 2, and/or a similar orifice 62 in the wall of the pipe 10 enabling fuel gas to pass from the jacket 14 into the passage 12. It is therefore possible by appropriately sizing the orifice 60 and/or the orifice 62 to enable fuel gas passed through the jacket 14 to perform the function of the fuel gas supplied through the conduit 26 in the burner shown in FIG. 1. Thus, if a modification of the burner 2 as shown in FIG. 4 is employed it may be possible to omit the conduit 26 and its valve 28 from the burner 2 shown in FIG. 1. Such omission will however have the consequence of preventing changes in the flow rate of fuel gas to the burner flame from being made, as such changes would cause changes in the pressure in the jacket 14 to take place and might therefore falsely indicate that holes have been formed in the pipe 10 by the abrasive action of the particulate material and we prefer that no such omission be made. It is also to be appreciated that the orifices 60 and 62 are sized so as to maintain a chosen elevated pressure in the jacket at a given fuel gas supply pressure and flow rate, and a fall in such pressure, as sensed by the pressure sensor 38, indicates that the abrasive action of the particulate fuel medium has formed a hole in the pipe 10.

Typically, therefore, during the initial period of operation of the burner 2, modified as shown in FIG. 4, fuel gas is supplied to the burner flame both the jacket 14 and the conduit 26, the valves 28 and 36 associated therewith both being open. As previously described with reference to FIG. 1 of the accompanying drawings, the valve 32 is in an open position during this initial period to permit air, or preferably oxygen-enriched air or commercially pure oxygen to be supplied to the flame. The valve 24 is kept closed until the temperature sensor 42 senses that the temperature of the enclosure has reached a desired value. Then the valve 36 is closed to reduce the rate at which fuel gas is supplied to the flame as the conduit 26 becomes the sole source of fuel gas, while simultaneously the valve 24 is opened and supply of the particulate fuel medium commenced. The rate of supply fo fuel gas to the jacket is left unaltered. A sudden drop in the pressure in the jacket 14 indicate that one or more holes in the pipe 10 have been formed by the abrasive action of the particulate fuel medium and as previously described, the burner is automatically shut down.

I claim:

1. A burner for burning a fuel medium or for oxidising or thermally treating a chemical medium including means forming at least one inner passage for conveying a stream of the fuel medium or chemical medium to a combustion zone created by the burner in operation thereof; means forming at least one outer passage for conveying a combustion-supporting gas to the combustion zone; and a jacket intermediate said inner and outer passages, and surrounding said inner passage along at least part of its length, means for placing a space between said inner passageway and jacket at a predetermined set pressure, and means for detecting a change in the pressure in said space.

2. A burner as claimed in claim 1, in which the jacket surrounds the inner passage along the entire length of the or each inner passage.

3. A burner as claimed in claim 1, in which there is no communication between the space and the inner passage (or inner passages) or between the space and the combustion zone created by the burner in operation thereof.

4. A burner as claimed in claim 1, in which the space communicates with the said inner passage, or the combustion zone created by the burner in operation thereof, or both, through one or more restricted orifices or restricted passages.

5. A burner as claimed in claim 1, in which the burner has at its outlet end a nozzle having an outlet passage in which the or each said inner passage terminates.

6. A burner as claimed in claim 5, in which the nozzle restricts said outer passage.

7. A burner as claimed in claim 5, in which the nozzle acts as a closure for the jacket.

8. A burner as claimed in claim 5, in which the jacket terminates in the nozzle, there being a restricted passage in said nozzle affording communication between the jacket and the combustion zone of the burner in operation thereof.

9. A method of burning a fuel medium or oxidising or thermally treating a chemical medium including the steps of supplying a stream of fuel medium or chemical medium to the combustion zone of a burner via at least one inner passage of the said burner; conveying a combustion-supporting gas to said combustion zone via at least one outer passage of said burner; maintaining a fluid pressure within a jacket intermediate said inner and outer passages and surroundng said inner passage along at least part of its length, and detecting a drop in the pressure within the jacket.

10. A method as claimed in claim 9, in which the fuel medium comprises pulverised coal carried by a fluid carrier.

11. A method as claimed in claim 10, in which the carrier is air.

12. A method as claimed in claim 10 in which from start-up of the burner at least until a time when an enclosure being heated by the burner has reached a temperature at which stable combustion of the pulverised coal is able to take place, a combustible fluid is supplied to the combustion zone of the burner and burned, and upon said temperature being reached, supply of the pulverized coal medium to the burner is commenced.

13. A method as claimed in claim 12, in which said combustible fluid is a fuel gas.

14. A method as claimed in claim 12, in which said combustible fluid is supplied to the combustion zone via the said inner passage of the burner and/or via the jacket.

15. A method as claimed in claim 12, in which the supply of combustible fluid to the combustion zone is continued after said temperature has been acquired.

16. A method as claimed in claim 9, in which pure oxygen or oxygen-enriched air is used as the combustion-supporting gas for at least part of the period during which the burner is operated.

17. A method as claimed in claim 9, in which the fuel medium comprises heavy fuel oil.

18. A method as claimed in claim 9, in which the chemical medium includes sulphide which is oxidised.

19. A method as claimed in claim 9, in which the chemical medium includes sulphate, which is thermally cracked.

20. A method as claimed in claim 9, in which said fluid in said jacket is a fluid selected from the group consisting essentially of air, nitrogen, carbon dioxide or a hydraulic fluid.

* * * * *